United States Patent
Garcia

(10) Patent No.: US 11,244,674 B2
(45) Date of Patent: Feb. 8, 2022

(54) RECORDED MEDIA HOTWORD TRIGGER SUPPRESSION

(71) Applicant: Google LLC, Mountain View, CA (US)

(72) Inventor: Ricardo Antonio Garcia, Mountain View, CA (US)

(73) Assignee: Google LLC, Mountain View, CA (US)

(*) Notice: Subject to any disclaimer, the term of this patent is extended or adjusted under 35 U.S.C. 154(b) by 210 days.

(21) Appl. No.: 16/537,033

(22) Filed: Aug. 9, 2019

(65) Prior Publication Data

US 2020/0035232 A1 Jan. 30, 2020

Related U.S. Application Data

(63) Continuation of application No. 15/614,213, filed on Jun. 5, 2017, now Pat. No. 10,395,650.

(51) Int. Cl.
*G06F 3/16* (2006.01)
*G10L 15/08* (2006.01)
(Continued)

(52) U.S. Cl.
CPC ............. *G10L 15/20* (2013.01); *G06F 3/167* (2013.01); *G10L 15/22* (2013.01); *G10L 19/018* (2013.01);
(Continued)

(58) Field of Classification Search
CPC ......... G06F 3/167; G10L 15/20; G10L 15/22; G10L 2015/088; G10L 2015/226; G10L 19/018
See application file for complete search history.

(56) References Cited

U.S. PATENT DOCUMENTS

| 4,363,102 A | 12/1982 | Holmgren |
| 5,659,665 A | 8/1997 | Whelpley, Jr. |

(Continued)

FOREIGN PATENT DOCUMENTS

| JP | S59-180599 | 10/1984 |
| JP | H11-52976 | 2/1999 |

(Continued)

OTHER PUBLICATIONS

Korean Intellectual Property Office, Korean Office Action for the related Application No. 10-2019-7022907, dated Dec. 25, 2020, 15 pages.

(Continued)

*Primary Examiner* — Daniel C Washburn
*Assistant Examiner* — Oluwadamilola M Ogunbiyi
(74) *Attorney, Agent, or Firm* — Honigman LLP; Brett A. Krueger; Grant Griffith

(57) ABSTRACT

Methods, systems, and apparatus, including computer programs encoded on a computer storage medium, for suppressing hotword triggers when detecting a hotword in recorded media are disclosed. In one aspect, a method includes the actions of receiving, by a computing device, audio corresponding to playback of an item of media content. The actions further include determining, by the computing device, that the audio includes an utterance of a predefined hotword and that the audio includes an audio watermark. The actions further include analyzing, by the computing device, the audio watermark. The actions further include based on analyzing the audio watermark, determining, by the computing device, whether to perform speech recognition on a portion of the audio following the predefined hotword.

20 Claims, 3 Drawing Sheets

(51) Int. Cl.
*G10L 15/20* (2006.01)
*G10L 15/22* (2006.01)
*G10L 19/018* (2013.01)

(52) U.S. Cl.
CPC .. *G10L 2015/088* (2013.01); *G10L 2015/226* (2013.01)

(56) References Cited

U.S. PATENT DOCUMENTS

| | | | |
|---|---|---|---|
| 5,897,616 | A | 4/1999 | Kanevsky |
| 5,983,186 | A | 11/1999 | Miyazawa et al. |
| 6,023,676 | A | 2/2000 | Erell |
| 6,141,644 | A | 10/2000 | Kuhn |
| 6,567,775 | B1 | 5/2003 | Maali |
| 6,671,672 | B1 | 12/2003 | Heck |
| 6,744,860 | B1 | 6/2004 | Schrage |
| 6,826,159 | B1 | 11/2004 | Shaffer |
| 6,931,375 | B1 | 8/2005 | Bossemeyer |
| 6,973,426 | B1 | 12/2005 | Schier |
| 7,016,833 | B2 | 3/2006 | Gable |
| 7,222,072 | B2 | 5/2007 | Chang |
| 7,571,014 | B1 | 8/2009 | Lambourne et al. |
| 7,720,012 | B1 | 5/2010 | Borah |
| 7,904,297 | B2 | 3/2011 | Mirkovic et al. |
| 8,099,288 | B2 | 1/2012 | Zhang |
| 8,194,624 | B2 | 6/2012 | Park et al. |
| 8,200,488 | B2 | 6/2012 | Kemp et al. |
| 8,209,174 | B2 | 6/2012 | Al-Telmissani |
| 8,214,447 | B2 | 7/2012 | Deslippe et al. |
| 8,340,975 | B1 | 12/2012 | Rosenberger |
| 8,588,949 | B2 | 11/2013 | Lambourne et al. |
| 8,670,985 | B2 | 3/2014 | Lindahl et al. |
| 8,713,119 | B2 | 4/2014 | Lindahl |
| 8,709,018 | B2 | 5/2014 | Dinerstein |
| 8,717,949 | B2 | 5/2014 | Crinon |
| 8,719,009 | B2 | 5/2014 | Baldwin et al. |
| 8,719,018 | B2 | 5/2014 | Dinerstein |
| 8,768,687 | B1 | 7/2014 | Quasthoff et al. |
| 8,775,191 | B1 | 7/2014 | Sharifi et al. |
| 8,805,890 | B2 | 8/2014 | Zhang et al. |
| 8,838,457 | B2 | 9/2014 | Cerra et al. |
| 8,918,326 | B1* | 12/2014 | Blesser .............. G10L 19/018 704/500 |
| 8,938,394 | B1 | 1/2015 | Faaborg et al. |
| 8,996,372 | B1 | 3/2015 | Secker-Walker |
| 9,142,218 | B2 | 9/2015 | Schroeter |
| 9,286,943 | B2* | 3/2016 | Gupta ................ G11B 27/105 |
| 9,548,053 | B1 | 1/2017 | Basye et al. |
| 9,830,950 | B2* | 11/2017 | Rodriguez ............ H05B 47/12 |
| 10,074,371 | B1 | 9/2018 | Wang |
| 10,102,855 | B1* | 10/2018 | Sindhwani ........... G06F 40/169 |
| 10,902,001 | B1* | 1/2021 | Rengasamy .......... H04L 67/141 |
| 2002/0049596 | A1 | 4/2002 | Burchard et al. |
| 2002/0072905 | A1 | 6/2002 | White |
| 2002/0123890 | A1 | 9/2002 | Kopp |
| 2002/0193991 | A1 | 12/2002 | Bennett et al. |
| 2003/0018479 | A1 | 1/2003 | Oh |
| 2003/0200090 | A1 | 10/2003 | Kawazoe |
| 2003/0231746 | A1 | 12/2003 | Hunter |
| 2004/0101112 | A1 | 5/2004 | Kuo |
| 2005/0165607 | A1 | 7/2005 | Di Fabbrizio et al. |
| 2006/0074656 | A1 | 4/2006 | Mathias |
| 2006/0085188 | A1 | 4/2006 | Goodwin et al. |
| 2006/0184370 | A1 | 8/2006 | Kwak et al. |
| 2007/0100620 | A1 | 5/2007 | Tavares |
| 2007/0198262 | A1 | 8/2007 | Mindlin |
| 2008/0252595 | A1 | 10/2008 | Boillot |
| 2009/0106796 | A1 | 4/2009 | McCarthy |
| 2009/0256972 | A1 | 10/2009 | Ramaswamy |
| 2009/0258333 | A1 | 10/2009 | Yu |
| 2009/0292541 | A1 | 11/2009 | Daya |
| 2010/0057231 | A1 | 3/2010 | Slater et al. |
| 2010/0070276 | A1 | 3/2010 | Wasserblat |
| 2010/0110834 | A1 | 5/2010 | Kim |
| 2011/0026722 | A1 | 2/2011 | Jing |
| 2011/0054892 | A1 | 3/2011 | Jung |
| 2011/0060587 | A1 | 3/2011 | Phillips et al. |
| 2011/0066429 | A1 | 3/2011 | Shperling |
| 2011/0066437 | A1* | 3/2011 | Luff ................... G06Q 30/02 704/254 |
| 2011/0184730 | A1 | 7/2011 | LeBeau et al. |
| 2011/0304648 | A1 | 12/2011 | Kim et al. |
| 2012/0084087 | A1 | 4/2012 | Yang |
| 2012/0232896 | A1 | 9/2012 | Taleb |
| 2012/0265528 | A1 | 10/2012 | Gruber et al. |
| 2013/0024882 | A1* | 1/2013 | Lee .................... H04N 21/858 725/23 |
| 2013/0060571 | A1 | 3/2013 | Soemo et al. |
| 2013/0124207 | A1 | 5/2013 | Sarin et al. |
| 2013/0132086 | A1 | 5/2013 | Xu et al. |
| 2013/0150117 | A1* | 6/2013 | Rodriguez ......... G06K 9/00006 455/550.1 |
| 2013/0183944 | A1 | 7/2013 | Mozer |
| 2014/0012573 | A1 | 1/2014 | Hung |
| 2014/0012578 | A1 | 1/2014 | Morioka |
| 2014/0088961 | A1 | 3/2014 | Woodward |
| 2014/0108020 | A1* | 4/2014 | Sharma ................ G10L 25/87 704/500 |
| 2014/0142958 | A1* | 5/2014 | Sharma ................ G10L 19/02 704/500 |
| 2014/0222430 | A1 | 8/2014 | Rao |
| 2014/0254801 | A1* | 9/2014 | Srinivasan ........... G10L 19/018 381/17 |
| 2014/0257821 | A1 | 9/2014 | Adams |
| 2014/0270194 | A1* | 9/2014 | Des Jardins .......... G10L 19/018 381/56 |
| 2014/0278383 | A1 | 9/2014 | Fan |
| 2014/0278435 | A1 | 9/2014 | Ganong, III |
| 2014/0343703 | A1* | 11/2014 | Topchy ............ G11B 20/00086 700/94 |
| 2015/0154953 | A1 | 6/2015 | Bapat |
| 2015/0262577 | A1 | 9/2015 | Nomura |
| 2015/0293743 | A1 | 10/2015 | Yang |
| 2015/0294666 | A1* | 10/2015 | Miyasaka ............... G10L 17/22 704/251 |
| 2015/0378664 | A1* | 12/2015 | Colmagro ............ H04L 12/2809 455/557 |
| 2016/0049153 | A1 | 2/2016 | Kakkirala et al. |
| 2016/0104483 | A1 | 4/2016 | Foerster et al. |
| 2016/0104498 | A1 | 4/2016 | Beack et al. |
| 2016/0260431 | A1 | 9/2016 | Newendorp |
| 2016/0378427 | A1* | 12/2016 | Sharma .................. G06F 3/165 700/94 |
| 2017/0083285 | A1 | 3/2017 | Meyers et al. |
| 2017/0084277 | A1 | 3/2017 | Sharifi |
| 2017/0110130 | A1 | 4/2017 | Sharifi |
| 2017/0110144 | A1 | 4/2017 | Sharifi |
| 2017/0117108 | A1 | 4/2017 | Richardson |
| 2017/0251269 | A1 | 8/2017 | Yoshizawa |
| 2018/0130469 | A1 | 5/2018 | Gruenstein |
| 2018/0182397 | A1 | 6/2018 | Carbune |
| 2018/0350356 | A1 | 12/2018 | Garcia |
| 2018/0350377 | A1* | 12/2018 | Karazoun ............. G10L 19/167 |
| 2019/0371329 | A1* | 12/2019 | D'Souza ............ H04M 3/42204 |
| 2020/0175989 | A1* | 6/2020 | Lockhart ................ G10L 15/26 |

FOREIGN PATENT DOCUMENTS

| | | |
|---|---|---|
| JP | H11-231896 | 8/1999 |
| JP | 2000-310999 | 11/2000 |
| JP | 2003295894 A | 10/2003 |
| JP | 2005338454 A | 12/2005 |
| JP | 2006227634 A | 8/2006 |
| JP | 2017513037 A | 5/2017 |
| KR | 10-2014-0031391 | 3/2014 |
| KR | 20160099617 A | 8/2016 |
| KR | 20160145766 A | 12/2016 |
| WO | 1998/040875 | 9/1998 |
| WO | 2014/008194 | 1/2014 |
| WO | 2015/025330 | 2/2015 |
| WO | 2016057269 A1 | 4/2016 |
| WO | WO2018/085192 | 5/2018 |
| WO | WO2018/208336 | 11/2018 |

(56) References Cited

FOREIGN PATENT DOCUMENTS

OTHER PUBLICATIONS

Auckenthaler et al. "Score Normalization for Text-independent Speaker Verification System," Digital Signal Processing, vol. 10, 2000, 13 pages.
EP Office Action in the European Appln. 18714917.4-1210, dated Jun. 24, 2019, 4 pages.
Garcia. Digital Watermarking of Audio Signals using a Psychoacoustic Auditory Model and Spread Spectrum Theory, $107^{th}$ Convention, Audio Engineering Society, New York, NY, Sep. 24-27, 1999, 42 pages.
International Search Report and Written Opinion, issued in International Application No. PCT/US2018/022101, dated May 25, 2018, 13 pages.
Jae-Seung, Choi, "Text-dependent Speaker Recognition using Characteristic Vectors in Speech Signal and Normalized Recognition Method," Journal of Korean Institute of Information Technology, 10(5), May 2012 (English Abstract).
Office Action, Japanese Application No. 2020-135793, dated Jun. 28, 2021, 10 pages.

\* cited by examiner

RECORDED MEDIA HOTWORD TRIGGER SUPPRESSION

CROSS-REFERENCE TO RELATED APPLICATION

This application is a continuation application of U.S. application Ser. No. 15/614,213, filed Jun. 5, 2017, which is incorporated by reference.

TECHNICAL FIELD

This specification generally relates to automated speech recognition.

BACKGROUND

The reality of a speech-enabled home or other environment—that is, one in which a user need only speak a query or command out loud and a computer-based system will field and answer the query and/or cause the command to be performed—is upon us. A speech-enabled environment (e.g., home, workplace, school, etc.) can be implemented using a network of connected microphone devices distributed throughout the various rooms or areas of the environment. Through such a network of microphones, a user has the power to orally query the system from essentially anywhere in the environment without the need to have a computer or other device in front of him/her or even nearby. For example, while cooking in the kitchen, a user might ask the system "how many milliliters in three cups?" and, in response, receive an answer from the system, e.g., in the form of synthesized voice output. Alternatively, a user might ask the system questions such as "when does my nearest gas station close," or, upon preparing to leave the house, "should I wear a coat today?"

Further, a user may ask a query of the system, and/or issue a command, that relates to the user's personal information. For example, a user might ask the system "when is my meeting with John?" or command the system "remind me to call John when I get back home."

SUMMARY

For a speech-enabled system, the users' manner of interacting with the system is designed to be primarily, if not exclusively, by means of voice input. Consequently, the system, which potentially picks up all utterances made in the surrounding environment including those not directed to the system, must have some way of discerning when any given utterance is directed at the system as opposed, e.g., to being directed at an individual present in the environment. One way to accomplish this is to use a hotword, which by agreement among the users in the environment, is reserved as a predetermined word that is spoken to invoke the attention of the system. In an example environment, the hotword used to invoke the system's attention are the words "OK computer." Consequently, each time the words "OK computer" are spoken, it is picked up by a microphone, conveyed to the system, which may perform speech recognition techniques or use audio features and neural networks to determine whether the hotword was spoken and, if so, awaits an ensuing command or query. Accordingly, utterances directed at the system take the general form [HOTWORD] [QUERY], where "HOTWORD" in this example is "OK computer" and "QUERY" can be any question, command, declaration, or other request that can be speech recognized, parsed and acted on by the system, either alone or in conjunction with the server via the network.

In addition to detecting a hotword, a computing device may be configured to detect audio watermarks embedded in the audio of the hotword. The audio watermark may be a high frequency watermark that is inaudible to humans or a watermark that sounds similar to background noise or static. The computing device may be configured to respond differently to hotwords depending on the audio watermark. For example, a business may create a commercial that includes an actor speaking, "Ok computer, give me directions to Computer Store." To prevent any computing device within the vicinity of a television playing the commercial from providing directions to computer store, the creators of the commercial may include an audio watermark that overlaps the hotword. A computing device detecting the audio of the commercial may extract the audio watermark and compare the audio watermark to an audio watermark database. The audio watermark database may include a rule for when a computing device should perform speech recognition on the audio following the hotword and this particular audio watermark and additional rules for other audio watermarks.

The rule for the audio watermark for the commercial may include conditions that a computing device should satisfy before further processing the audio from the commercial. An example rule may be that a computing device should respond if the computing device is not currently providing directions, is not moving greater than ten miles per hour, is a smart speaker, and is located at the user's home. If the computing device satisfies these rules, then the computing device may perform speech recognition on the portion following the hotword. If the transcription is, "give me directions to computer store," then the computing device may display or audibly provide directions to computer store. If the computing device does not satisfy the rules, then the computing devices does not perform speech recognition on the portion of the audio following the hotword and performs no further actions in response to the audio.

In some implementations, the audio watermark may encode data that may eliminate the need for the computing device to compare the audio watermark to an audio watermark database. The encoded data may include a rule for when the computing device should perform speech recognition, an identifier, an action, or any other similar data. In some implementations, the computing device may use the encoded data in combination with the audio watermark database to determine whether to perform speech recognition on the audio following the hotword.

According to an innovative aspect of the subject matter described in this application, a method for suppressing hotword triggers when detecting a hotword in recorded media includes the actions of receiving, by a computing device, audio corresponding to playback of an item of media content; determining, by the computing device, that the audio includes an utterance of a predefined hotword and that the audio includes an audio watermark; analyzing, by the computing device, the audio watermark; and based on analyzing the audio watermark, determining, by the computing device, whether to perform speech recognition on a portion of the audio following the predefined hotword.

These and other implementations can each optionally include one or more of the following features. The action of analyzing the audio watermark includes comparing the audio watermark to one or more audio watermarks. The action of determining whether to perform speech recognition on the portion of the audio following the predefined hotword is based further on comparing the audio watermark to one or more audio watermarks. The audio watermark is an inaudible portion of the audio corresponding to playback of an item of media content. The actions further include, based on analyzing the audio watermark, identifying a source of the audio corresponding to playback of the item of media content. The action of determining whether to perform speech recognition on the portion of the audio following the predefined hotword is further based on the source of the audio corresponding to playback of the item of media content. The actions further include, based on analyzing the audio watermark, identifying a source of the audio corresponding to playback of an item of media content; and updating a log file to indicate the source of the audio corresponding to playback of the item of media content.

The audio watermark is included in a portion of the audio that includes the utterance of the predefined hotword. the actions further include determining a type of the additional computing device. The action of determining whether to perform speech recognition on the portion of the audio following the predefined hotword is further based on the type of the additional computing device. The action of determining, by the computing device, whether to perform speech recognition on a portion of the audio following the predefined hotword includes determining to perform speech recognition on the portion of the audio following the predefined hotword. The actions further include generating, by an automated speech recognizer, a transcription of the audio following the predefined hotword; and performing an action corresponding to the transcription of the audio following the predefined hotword. The action of determining, by the computing device, whether to perform speech recognition on a portion of the audio following the predefined hotword includes determining not to perform speech recognition on the portion of the audio following the predefined hotword. The actions further include suppressing an action corresponding to the audio corresponding to playback of the item of media content.

The actions further include determining a location of the additional computing device. The action of determining whether to perform speech recognition on the portion of the audio following the predefined hotword is further based on the location of the additional computing device. The actions further include determining a user setting of the additional computing device. The action of determining whether to perform speech recognition on the portion of the audio following the predefined hotword is further based on the user setting of the additional computing device. The action of determining, by the computing device, that the audio includes an utterance of a predefined hotword and that the audio includes an audio watermark includes determining that the audio includes an utterance of a predefined hotword; and, based on determining that the audio includes an utterance of a predefined hotword, determining that the audio includes the audio watermark. The action of determining, by the computing device, that the audio includes an utterance of a predefined hotword and that the audio includes an audio watermark includes determining that the audio includes an utterance of a predefined hotword; and after determining that the audio includes an utterance of a predefined hotword, determining that the audio includes the audio watermark.

The action of analyzing the audio watermark includes extracting data that is encoded in the audio watermark. The action of determining whether to perform speech recognition on a portion of the audio following the predefined hotword is further based on the data that is encoded in the audio watermark. The actions further include, based on analyzing the audio watermark, identifying a type of media content of the audio corresponding to playback of an item of media content; and updating a log file to indicate the type of media content of the audio corresponding to playback of the item of media content. The actions further include, based on analyzing the audio watermark, identifying a type of media content of the audio corresponding to playback of the item of media content. The action of determining whether to perform speech recognition on the portion of the audio following the predefined hotword is further based on the type of media content of the audio corresponding to playback of the item of media content. The actions further include, based on analyzing the audio watermark, determining, by the computing device, whether to perform natural language processing on a portion of the audio following the predefined hotword.

Other embodiments of this aspect include corresponding systems, apparatus, and computer programs recorded on computer storage devices, each configured to perform the operations of the methods.

Particular embodiments of the subject matter described in this specification can be implemented so as to realize one or more of the following advantages. A computing device may respond to hotwords that include only specific audio watermarks, thus saving battery power and processing capacity of the computing device. Network bandwidth may be preserved with fewer computing devices performing search queries upon receiving hotwords with audio watermarks.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
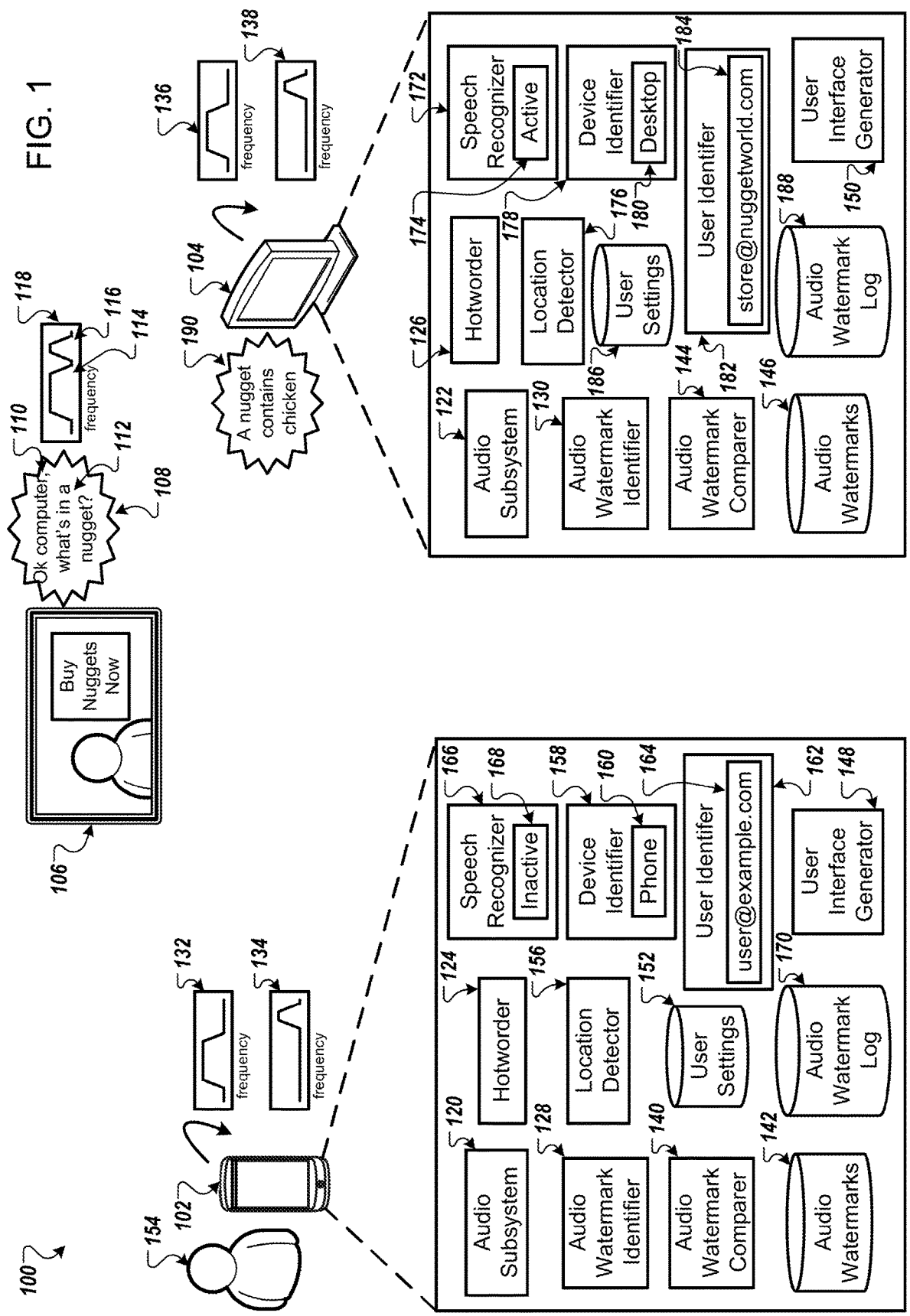
FIG. 1 illustrates an example system for suppressing hotword triggers when detecting a hotword in recorded media.

FIG. 1 illustrates an example system 100 for suppressing hotword triggers when detecting a hotword in recorded media. Briefly, and as described in more detail below, computing devices 102 and 104 receive audio 108 output from an audio source 106 (e.g., a television). The audio 108 includes an utterance of a predefined hotword and an audio watermark. Both computing devices 102 and 104 process the audio 108, and determine that the audio 108 includes the predefined hotword. The computing devices 102 and 104 identify the audio watermark. Based on the audio watermark and the context or characteristics of the computing devices 102 and 104, each of the computing devices 102 and 104 may perform speech recognition on the audio.

In the example shown in FIG. 1, the audio source 106 is playing a commercial for Nugget World. During the commercial, an actor in the commercial says the utterance 108, "Ok computer, what's in a nugget?" The utterance 108 includes the hotword 110 "Ok computer" and a query 112

"what's in a nugget?" The audio source 106 outputs the utterance 108 through a speaker. Any computing device in the vicinity with a microphone is able to detect the utterance 108.

The audio of the utterance 108 includes an audible portion 114 and an audio watermark 116. The creator of the commercial may add the audio watermark 116 to ensure particular computing devices responds correctly to the utterance 108. In some implementations, the audio watermark 116 may include audio frequencies that are higher or lower than human hearing range. For example, the audio watermark 116 may include frequencies that are greater than 20 kHz or less than 20 Hz. In some implementations, the audio watermark 116 may include audio that is within the human hearing range but is not detectable by humans because of its sounds similar to noise. For example, the audio watermark 116 may include a frequency pattern between 8 and 10 kHz. The strength of different frequency bands may be imperceptible to a human, but may be detectable by a computing device. As illustrated by the frequency domain representation 118 of the audio 108 includes an audio watermark 116 that is in a higher frequency range than the audible portion 114.

The computing devices 102 and 104 may be any type of device that is capable of receiving audio through a microphone. For example, computing devices 102 and 104 can be a desktop computer, laptop computer, a tablet computer, a wearable computer, a cellular phone, a smart phone, a music player, an e-book reader, a navigation system, a smart speaker and home assistant, wireless (e.g., Bluetooth) headset, hearing aid, smart watch, smart glasses, activity tracker, or any other appropriate computing device. As illustrated in FIG. 1, computing device 102 is a smart phone and computing device 104 is a desktop computer. The audio source 106 can be any source of audio such as, for example, a television, a radio, a music player, a desktop computer, laptop computer, a tablet computer, a wearable computer, a cellular phone, or a smart phone. As illustrated in FIG. 1, the audio source 106 is a television.

The computing devices 102 and 104 each receive the audio through a microphone. With respect to computing device 102, the microphone may be part of an audio subsystem 120. The audio subsystem 120 may include buffers, filters, analog to digital converters that are each designed to initially process the audio received through the microphone. The buffer may store the current audio received through the microphone and processed by the audio subsystem 120. For example, the buffer stores the previous five seconds of audio data. Similarly, the microphone of computing device 104 may be part of an audio subsystem 122. The audio subsystem 122 may include buffers, filters, analog to digital converters that are each designed to initially process the audio received through the microphone. The buffer may store the current audio received through the microphone and processed by the audio subsystem 122. For example, the buffer stores the previous three seconds of audio data.

The computing devices 102 and 104 each include a hotworder 124 and 126, respectively. The hotworders 124 and 126 are each configured to identify hotwords in audio received through the microphone and/or stored in the buffer. In some implementations, the hotworders 124 and 126 may be active at any time that the computing devices 102 and 104 are powered on. The hotworder 124 continuously analyzes the audio data stored in the buffer. The hotworder 124 computes a hotword confidence score that reflects the likelihood that current audio data in the buffer includes a hotword. To compute the hotword confidence score, the hotworder 124 may extract audio features from the audio data such as filterbank energies or mel-frequency cepstral coefficients. The hotworder 124 may use classifying windows to process these audio features such as by using a support vector machine or a neural network. In some implementations, the hotworder 124 does not perform speech recognition to determine a hotword confidence score. The hotworder 124 determines that the audio includes a hotword if the hotword confidence score satisfies a hotword confidence score threshold. For example, the hotworder 124 determines that the audio that corresponds to utterance 108 includes the hotword 110 if the hotword confidence score is 0.8 and the hotword confidence score threshold is 0.7. The hotworder 126 may functional similarly to the hotworder 124.

The computing devices 102 and 104 each include an audio watermark identifier 128 and 130, respectively. The audio watermark identifiers 128 and 130 are each configured to process the audio received through the microphone and/or stored in the buffer and identify audio watermarks that are included in the audio. The audio watermark identifiers 128 and 130 may each be configured to detect spread spectrum and psychacoustic shaping types of watermarks. These types of watermarks may be located in frequency bands that overlap the frequency bands of the corresponding audio. A human may perceive these types of watermark as noise. The audio watermark identifiers 128 and 130 may also each be configured to detect high frequency watermarks. These types of watermarks may be located in frequency bands that are above the frequency bands of the corresponding audio. The frequency bands of the high frequency watermarks may be above the threshold of human hearing. The audio watermark identifiers 128 and 130 may also each be configured to detect low frequency watermarks. These types of watermarks may be located in frequency bands that are below the frequency bands of the corresponding audio. The frequency bands of the low frequency watermarks may be below the threshold of human hearing. In some implementations, the audio watermark identifiers 128 and 130 process the audio in response to the respective hotworder 124 and 126 detecting a hotword.

The audio watermark identifiers 128 and 130 may each be configured to separate the audio watermark and the primary audio. The primary audio may be the portion of the audio to which the audio watermark was added. For example, the primary audio may include the audible portion 114 which includes the audio corresponding to "Ok computer, what's in a nugget?" without watermark 116. The audio watermark identifier 128 separates the audio 118 that was received through the microphone of the computing device 102 into the primary audio 132 and the audio watermark 134. Similarly, the audio watermark identifier 130 separates the audio 118 that was received through the microphone of the computing device 104 into the primary audio 136 and the audio watermark 138. In some implementations, audio watermark and the primary audio may overlap in the time domain.

In some implementations, the audio watermark identifiers 128 and 130 may process the audio watermarks 134 and 138, respectively, to identify a corresponding bitstream of the audio watermark. For example, the audio watermark identifier 128 may process the audio watermark 134 and determine that the audio watermark 134 corresponds to a bitstream of 0101101110101. The audio watermark identifier 130 may preform similar processing on the audio watermark 138.

The audio watermark comparers 140 and 144 each compare the respective audio watermarks 134 and 138 to the audio watermarks 142 and 146, respectively. For example, the audio watermark comparer 140 may compare the frequency pattern or bitstream of watermark 134 to the audio watermarks 142. The audio watermark comparer 140 may determine that the audio watermark 134 matches an audio watermark of Nugget World. The audio watermark comparer 144 may make a similar determination.

The audio watermarks 142 and 146 may contain audio watermarks that various entities embed in the audio of commercials or other distributed or broadcast audio that contain a hotword. Nugget World may include a watermark in the audio 108 to ensure what only particular devices respond to the hotword, perform speech recognition on the audio, and execute the query 112. Nugget World may provide the audio watermark 116 for inclusion in the audio watermarks 142 and 146 along with instructions for when devices should respond to the hotword with the audio watermark 116. For example, Nugget World may include in the audio watermarks 142 and 146 instructions for any device with a Nugget World user identifier that are located in a Nugget World restaurant to respond to the hotword with the audio watermark 116. In some implementations, the audio watermarks 142 and 146 are stored on the computing devices 102 and 104 and updated periodically, for example, once per day. In some implementations, the audio watermarks 142 or 146, the audio watermark identifiers 128 and 130, and/or the audio watermark comparers 140 and 144 may be located on a remote server. In this instance, the computing device 102 or 104 may communicate with the remote server over a network.

The computing device 102 extracted the audio watermark 134 and matches the audio watermark 134 to a Nugget World watermark. Based on the instructions in the audio watermarks 142 for the Nugget World watermark, the computing device 102 may perform speech recognition on the primary audio 132 and execute any queries or commands included in the corresponding transcription. The instructions may include a set of rules for the computing device 102 to follow to determine whether to perform speech recognition.

The computing device 102 includes a location detector 156. The location detector 156 may generate geographic location data that reflects the location of the computing device. The location detector 156 may use any geographic location technique, for example, GPS, triangulation, and/or any other similar locating technique. In some implementations, the location detector 156 may access map or location data that indicates locations of various points of interest, such as businesses. The location detector 156 may further identify a point of interest or business where the computing device is located. For example, the location detector 156 may determine that the computing device 102 is located at Nugget World.

The computing device 102 includes a device identifier 158. The device identifier 158 includes a device identity 160 that identifies the type of device for computing device 102. The device identity 160 may be a desktop computer, laptop computer, a tablet computer, a wearable computer, a cellular phone, a smart phone, a music player, an e-book reader, a navigation system, a smart speaker and home assistant, or any other appropriate computing device. For example, the device identity 160 of computing device 102 is phone.

The computing device 102 includes a user identifier 162. The user identifier 162 includes a user identity 164 that identifies the user for computing device 102. The user identity 164 may be an email address, phone number, or any other similar type of unique user identifier. For example, the user identity 164 of computing device 102 is user@example.com. The user identifier 162 may be input by the user 154.

The computing device 102 includes user settings 152. The user settings 152 may be provided by the user 154 and may include additional rules for how the computing device 102 should respond to a hotword. For example, the user settings 152 may include a rule that the computing device 102 does not respond to any hotwords that include audio watermarks unless the computing device 102 receives the hotword that includes an audio watermark while at home. As another example, the user settings 152 may include a rule that the computing device 102 does not responds to hotwords that include audio watermarks that correspond to particular businesses, such as Chicken World. In some implementations, the user 154 may agree to allow the computing device 102 to respond to hotwords with a watermark of a particular business in exchange for a shopping discount or similar incentive.

In the example illustrated in FIG. 1, speech recognizer 166 remains inactive as indicated by the speech recognizer status 168. The computing device 102 set the speech recognizer status 168 to inactive based on applying of the instructions corresponding to the audio watermark 134 as stored in the audio watermarks to the device location, user settings 152, device identity 160, and the user identity 164. For example, the instructions corresponding to the audio watermark 134 may be to set the speech recognizer status 168 to active if the user identity 164 is a Nugget World identifier and the device is located at a Nugget World restaurant. For computing device 102, the user identity 164 is not a Nugget World identifier. Therefore, the speech recognizer status 168 is inactive.

In some implementations, the user interface generator 148 of the computing device 102 may provide, to a display of the computing device, data for a graphical interface. The graphical interface may indicate the processes or actions of the computing device 102 while, in advance of, or after the computing device has performed the processes or actions. For example, the user interface generator 148 may display an interface indicating that the computing device 102 is processing received audio, that the computing device 102 is identifying the audio watermark 134, the speech recognizer status 168, and/or any properties or rules of the identified audio watermark 134.

In some implementations, the user interface generator 148 may generate an interface indicating that the speech recognizer status 168 is inactive. The interface may also include a user selectable option to override the speech recognizer status 168. For example, user 154 may select an option to set the speech recognizer status 168 to active. Having heard the query 112 "what's in a nugget," the user 154 may be curious and request that the computing device 102 process the query 112 and provide an output.

In some implementations, the computing device 102 may include an audio watermark log 170. The audio watermark log 170 may include data indicating a number of times that the computing device 102 has received each audio watermark. For example, each time that the computing device 102 receives and identifies audio watermark 134, the computing device 102 may store data indicating the receipt of the audio watermark 134 in the audio watermark log 170. The data may include a timestamp, a device location, any relevant user settings, user identifiers, and any other similar information. In some implementations, the computing device 102 may provide the data of the audio watermark log 170 to an aggregate audio watermark log on a server that combines the audio watermark logs from different computing devices that receive audio watermarks. The aggregate audio watermark log may include the user identities for the receiving computing device, a device identifier, and data stored in the audio watermark log 170. In some implementations, the data in the aggregate audio watermark log and the audio watermark log 170 may synchronize. In this instance, the audio watermark log 170 may include additional log data from different devices as well as data identifying the different devices, different users, location information, timestamp data, and other related information.

In some implementations, the instructions for a particular audio watermark may include instructions related to the data stored in the audio watermark log 170. The instructions may relate to a particular number of times that a hotword marked with a particular audio watermark should activate a speech recognizer. For example, the instructions may indicate that within 24-hour period, the audio watermark 116 should only activate the speech recognizer 166 once.

In some implementations, the creator of the commercial on audio device 106 may access the aggregate audio watermark log to identify the details related to each time the hotword 110 and corresponding audio watermark 116 activated a speech recognizer. In some implementations, a user may indicate through the user settings on the device for the computing device not to upload the audio watermark log to the aggregate audio watermark log. In some implementations, a creator, or owner, of the commercial on audio device 106 may pay a fee to the entity operating the audio watermark system each time an audio watermark of the creator is processed by a computing device or each time an audio watermark of the creator activates a speech recognizer of a computing device.

The computing device 104 processes the audio watermark 138 in a similar fashion to the computing device 102 processing the audio watermark 134. In particular, the computing device 104 extracted the audio watermark 138 and matches the audio watermark 138 to a Nugget World watermark. Based on the instructions in the audio watermarks 146 for the Nugget World watermark, the computing device 102 may perform speech recognition on the primary audio 136 and execute any queries or commands included in the corresponding transcription. The instructions may include a set of rules for the computing device 104 to follow to determine whether to perform speech recognition.

The computing device 104 includes a location detector 176. The location detector 176 may generate geographic location data that reflects the location of the computing device. The location detector 176 may use any geographic location technique, for example, GPS, triangulation, and/or any other similar locating technique. In some implementations, the location detector 176 may access map or location data that indicates locations of various points of interest, such as businesses. The location detector 176 may further identify a point of interest or business where the computing device 104 is located. For example, the location detector 176 may determine that the computing device 104 is located at Nugget World.

The computing device 104 includes a device identifier 178. The device identifier 178 includes a device identity 180 that identifies the type of device for computing device 104. The device identity 180 may be a desktop computer, laptop computer, a tablet computer, a wearable computer, a cellular phone, a smart phone, a music player, an e-book reader, a navigation system, a smart speaker and home assistant, or any other appropriate computing device. For example, the device identity 180 of computing device 104 is desktop computer.

The computing device 104 includes a user identifier 182. The user identifier 182 includes a user identity 184 that identifies the user for computing device 104. The user identity 184 may be an email address, phone number, or any other similar type of unique user identifier. For example, the user identity 184 of computing device 108 is store@nuggetworld.com. The user identifier 182 may be input by a user.

The computing device 104 includes user settings 186. The user settings 186 may be provided by a user and may include additional rules for how the computing device 104 should respond to a hotword. For example, the user settings 186 may include a rule that the computing device 104 does not respond to any hotwords that include audio watermarks unless the computing device 104 is located at a Nugget World restaurant. As another example, the user settings 186 may include a rule that the computing device 104 does not respond to any hotwords other than those marked with audio watermarks from Nugget World. As another example, the user settings 186 may indicate that the computing device 104 does not respond to any hotwords with any type of audio watermark outside of Nugget World's business hours.

In the example illustrated in FIG. 1, speech recognizer 172 is active as indicated by the speech recognizer status 174. The computing device 104 set the speech recognizer status 174 to active based on applying of the instructions corresponding to the audio watermark 138 as stored in the audio watermarks to the device location, user settings 186, device identity 180, and the user identity 184. For example, the instructions corresponding to the audio watermark 134 may be to set the speech recognizer status 174 to active if the user identity 184 is a Nugget World identifier and the device is located at a Nugget World restaurant. For computing device 104, the user identity 184 is a Nugget World identifier and the location is at a Nugget World. Therefore, the speech recognizer status 174 is active.

The speech recognizer 172 performs speech recognition on the primary audio 136. The speech recognizer 172 generates the transcription "what's in a nugget." The computing device 104 may provide the transcription to a search engine if the transcription corresponds to a query. The computing device may execute a command if the transcription corresponds to a command. In the example in FIG. 1, the computing device 104 provides the transcription of the primary audio 136 to a search engine. The search engine returns a result, and the computing device 104 may output the result through a speaker. For example, the computing device 104 may output the audio 190 of "a nugget contains chicken." In some implementations, the user interface generator 150 may display the search results on the display of the computing device 104.

In some implementations, the user interface generator 150 may provide additional interfaces. The graphical interface may indicate the processes or actions of the computing device 104 while, in advance of, or after the computing device 104 has performed the processes or actions. For example, the user interface generator 150 may display an interface indicating that the computing device 104 is processing received audio, that the computing device 104 is identifying the audio watermark 138, the speech recognizer status 174, and/or any properties or rules of the identified audio watermark 138.

In some implementations, the user interface generator 150 may generate an interface indicating that the speech recognizer status 174 is active. The interface may also include a user selectable option to override the speech recognizer status 174. For example, a user may select an option to set the speech recognizer status 174 to suppress any actions related to the transcriptions. In some implementations, the user interface generator 150 may generate an interface to update the user settings 186 based on the recently received override and the current properties of the computing device 104. The user interface generator 148 may also provide a similar interface after receiving an override command.

In some implementations, the computing device 104 may include an audio watermark log 188. The audio watermark log 188 may store data similar to audio watermark log 170 based on the audio watermarks received by the computing device 104. The audio watermark log 188 may interact with an aggregate audio watermark log in a similar fashion to the audio watermark log 170.

In some implementations, the computing devices 102 and 104 may perform speech recognition on the primary audio 134 and 138, respectively, independent of the rules stored in the audio watermarks 142 and 146. The audio watermarks 142 and 146 may include rules related to performing actions of the primary audio based in part on the transcription.

Figure 2:
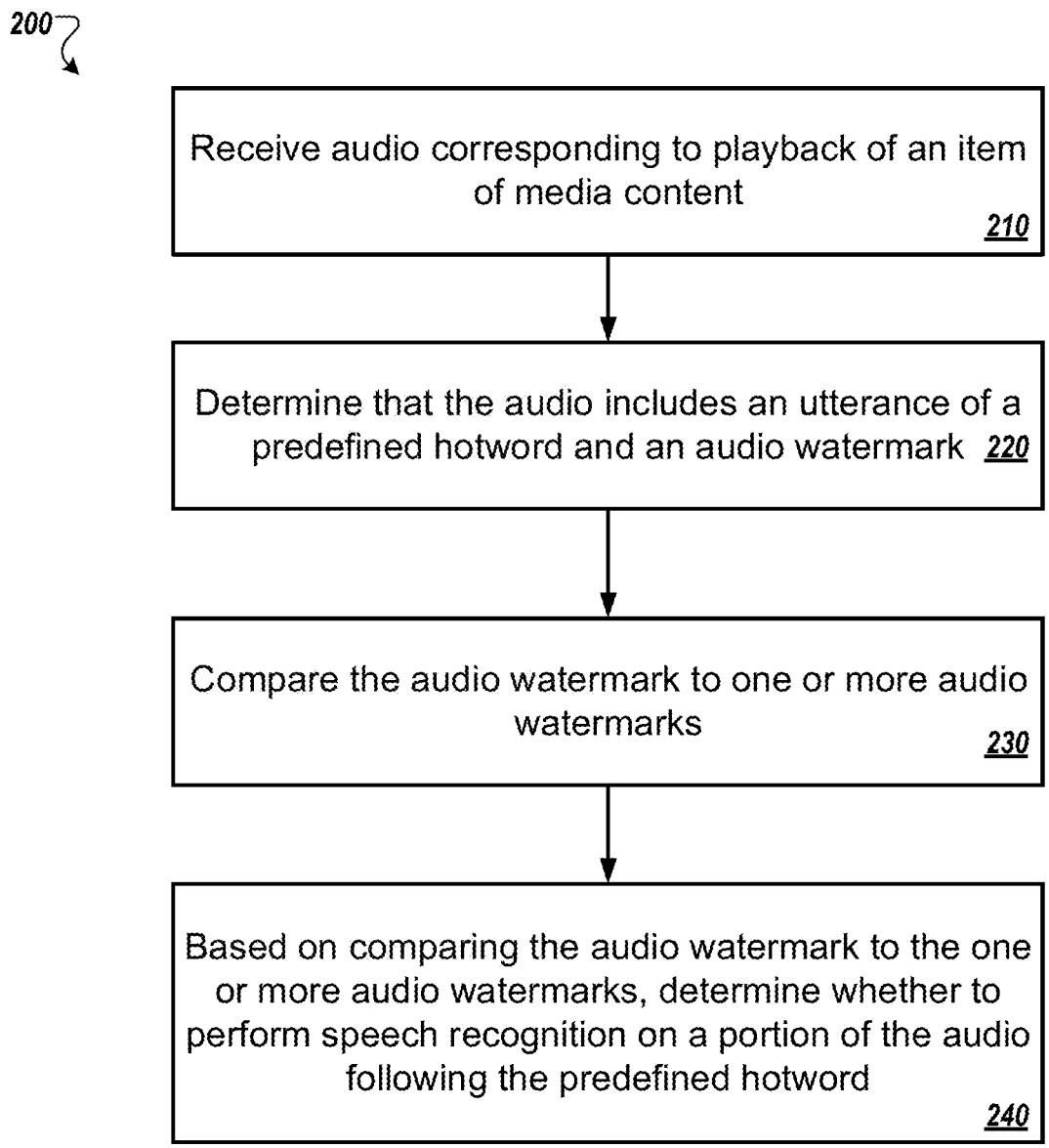
FIG. 2 is a flowchart of an example process for suppressing hotword triggers when detecting a hotword in recorded media.

FIG. 2 illustrates an example process 200 for suppressing hotword triggers when detecting a hotword in recorded media. In general, the process 200 performs speech recognition on audio corresponding to media content based on the audio including a hotword and a watermark. The process 200 will be described as being performed by a computer system comprising one or more computers, for example, the computing devices 102 or 104 as shown in FIG. 1.

The system receives audio corresponding to playback of an item of media content (210). In some implementations, the audio may be received through a microphone of the system. The audio may correspond to the audio of a commercial played on a television or the radio.

The system determines that the audio includes an utterance of a predefined hotword and an audio watermark (220). In some implementations, the audio watermark is an inaudible portion of the audio. For example, the audio watermark may be located in frequency bands that are above or below those of human hearing. In some implementations, the audio watermark is audible, but sounds similar to noise. In some implementations, the audio watermark overlaps the audio of the predefined hotword. In some implementations, the system determines that the audio includes the predefined hotword. In response to that determination, the system processes the audio to determine whether the audio includes an audio watermark.

The system compares the audio watermark to one or more audio watermarks (230). In some implementations, the system may compare the audio watermark to a database of audio watermarks. The database may be stored on the system or on a different computing device. The system may compare a digital representation of the audio watermark or an analog representation of the audio watermark in the time and/or frequency domain. The system may identify a matching audio watermark and process the audio according to a rule specified in the database for the identified audio watermark. In some implementations, the system may identify a source, or owner, of the audio watermark. For example, the source, or owner, may be the entity, Nugget World. The system may update a log file to indicate that the system received a hotword with a Nugget World audio watermark.

The system based on comparing the audio watermark to the one or more audio watermarks, determines whether to perform speech recognition on a portion of the audio following the predefined hotword (240). Based on the rule specified in the database for identified audio watermark, the source of the audio watermark, and the context of the system, the system determines whether to perform speech recognition on the audio following the predefined hotword. The context of the system may be based on any combination of a type of the system, a location of the system, and any user settings. For example, the rule may specify that mobile phones that are located at the user's home should perform speech recognition on the audio upon receiving a hotword with a particular watermark from the management company of the apartment where the user lives. In some implementations, the system determines, based on comparing the audio watermark to the one or watermarks or based on analyzing the audio watermark, whether to perform natural language processing on the portion of the audio following the predefined hotword. The system may perform natural language processing in additional to the speech recognition or in place of the speech recognition.

In instances where the system determines to perform speech recognition, the system generates a transcription of the audio that follows the hotword. The system executes a command included in the transcription, such as adding a calendar appointment for an apartment building meeting, or submits a query to a search engine. The system may output the search results over a speaker of the system or on the display of the system or both.

In instances where the system determines not to perform speech recognition, the system may remain in sleep mode standby mode, or low-energy mode. The system may be in sleep mode standby mode, or low-energy mode while processing the audio and may remain in sleep mode, standby mode, or low-energy mode if the system does not perform speech recognition on the audio. In some implementations, the user 154 may be using the computing device 102 while the computing device 102 receives the audio 118. For example, the user 154 may be listening to music or viewing a photo application. In this instance, the hotword and audio watermark processing may occur in the background, and the user's activities may be uninterrupted. In some implementations, the audio may not include an audio watermark. In this instance the system may perform speech recognition on the audio after the hotword and execute any command or query included in the audio.

In some implementations, the system may determine a type of media content for the audio. The system may compare the audio watermark to the audio watermarks included in the audio watermark database. The system may identify a matching audio watermark in the audio watermark database, and the matching audio watermark may identify a type of media content for that particular audio watermark. The system may apply the rule for the identified type of media content. For example, an audio watermark database may indicate that an audio watermark is included in sales media, directional media, commercial media, political media, or any other type of media. In this instance, the system may follow a general rule for the type of media. For example, the rule may be to only perform speech recognition for commercial media when the system is located at home. The rule may also be a rule that is specific to the received audio watermark. In some implementations, the system may also record the type of media content in the audio watermark log.

In some implementations, the system may analyze the audio watermark. The system may analyze the audio watermark in place of or in combination with comparing the audio watermark to the audio watermark database. The audio watermark may encode an action, an identifier, a rule, or any other similar data. The system may decode the audio watermark and process the audio according to the decoded audio watermark. The audio watermark may be encoded as a header and payload. The system may identify the header, which may be common to all or almost all audio watermarks or may identify particular groups of audio watermarks. A payload may follow the header and encode the action, identifier, rule, or other similar data.

The system may apply the rule encoded in the audio watermark. For example, the rule may be for the system to perform speech recognition on the portion of the audio following the hotword if the system is a smart speaker that is located at place of business that corresponds to the user identifier stored in the system. In this instance, the system may have no need to access an audio watermark database. In some implementations, the system may add the rule encoded in the audio watermark to an audio watermark database.

The system may use the data encoded in the audio watermark in combination with the audio watermark database. For example, data encoded in the audio watermark may indicate that the audio is political media content. The system may access a rule that corresponds to the audio watermark and that specifies for the system to perform speech recognition on audio that includes the political media content watermark or a commercial media content watermark when the system is a located in the user's home. In this instance, the audio watermark may include a header or other portion that the system may use to identify corresponding audio watermarks in the audio watermark database. The payload may encode the type of media content or other data such as action, identifier, or rule.

Figure 3:
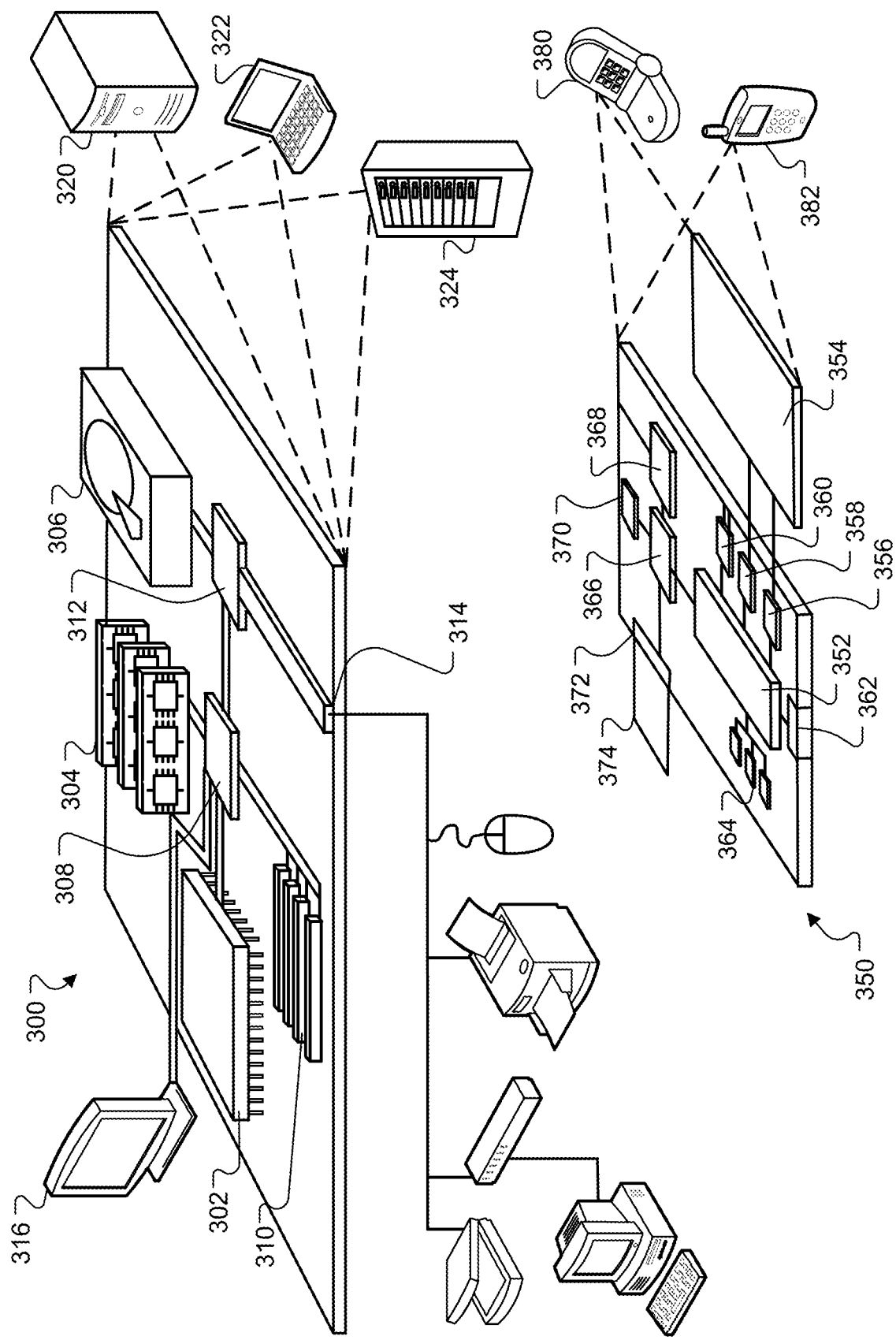
FIG. 3 is an example of a computing device and a mobile computing device.

FIG. 3 shows an example of a computing device 300 and a mobile computing device 350 that can be used to implement the techniques described here. The computing device 300 is intended to represent various forms of digital computers, such as laptops, desktops, workstations, personal digital assistants, servers, blade servers, mainframes, and other appropriate computers. The mobile computing device 350 is intended to represent various forms of mobile devices, such as personal digital assistants, cellular telephones, smart-phones, wireless (e.g., Bluetooth) headsets, hearing aid, smart watches, smart glasses, activity trackers, and other similar computing devices. The components shown here, their connections and relationships, and their functions, are meant to be examples only, and are not meant to be limiting.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as a display 316 coupled to the high-speed interface 308. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.

The storage device 306 is capable of providing mass storage for the computing device 300. In some implementations, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 302), perform one or more methods, such as those described above. The instructions can also be stored by one or more storage devices such as computer- or machine-readable mediums (for example, the memory 304, the storage device 306, or memory on the processor 302).

The high-speed interface 308 manages bandwidth-intensive operations for the computing device 300, while the low-speed interface 312 manages lower bandwidth-intensive operations. Such allocation of functions is an example only. In some implementations, the high-speed interface 308 is coupled to the memory 304, the display 316 (e.g., through a graphics processor or accelerator), and to the high-speed expansion ports 310, which may accept various expansion cards (not shown). In the implementation, the low-speed interface 312 is coupled to the storage device 306 and the low-speed expansion port 314. The low-speed expansion port 314, which may include various communication ports (e.g., USB, Bluetooth, Ethernet, wireless Ethernet) may be coupled to one or more input/output devices, such as a keyboard, a pointing device, a scanner, a microphone, speakers, or a networking device such as a switch or router, e.g., through a network adapter.

The computing device 300 may be implemented in a number of different forms, as shown in the figure. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile device (not shown), such as a mobile computing device 350. Each of such devices may contain one or more of the computing device 300 and the mobile computing device 350, and an entire system may be made up of multiple computing devices communicating with each other.

The mobile computing device 350 includes a processor 352, a memory 364, an input/output device such as a touch-enabled display 354, a communication interface 366, and a transceiver 368, among other components. The mobile computing device 350 may also be provided with a storage device, such as a micro-drive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analog and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provided as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 352), perform one or more methods, such as those described above. The instructions can also be stored by one or more storage devices, such as one or more computer- or machine-readable mediums (for example, the memory 364, the expansion memory 374, or memory on the processor 352). In some implementations, the instructions can be received in a propagated signal, for example, over the transceiver 368 or the external interface 362.

The mobile computing device 350 may communicate wirelessly through the communication interface 366, which may include digital signal processing circuitry where necessary. The communication interface 366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 368 using a radio-frequency. In addition, short-range communication may occur, such as using a Bluetooth, WiFi, or other such transceiver (not shown). In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, etc.) and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A method comprising:
receiving, at data processing hardware, audio data corresponding to playback of an item of media content, the audio data comprising an audio watermark and an utterance of a command preceded by a hotword;
determining, by the data processing hardware, that the received audio data includes the hotword;
processing, by the data processing hardware, the audio data to:
identify the audio watermark included in the audio data; and
determine a corresponding bitstream of the audio watermark; and
based on the determined corresponding bitstream of the audio watermark, determining, by the data processing hardware, without accessing an audio watermark database to identify a matching audio watermark, to bypass performing the command preceded by hotword.

2. The method of claim 1, wherein the audio watermark is added to the audio data by a creator of the item of media content.

3. The method of claim 1, wherein processing the audio data to identify the audio watermark in the audio data comprises detecting a spread spectrum shaping type of watermark.

4. The method of claim 1, wherein determining that the received audio data includes the hotword comprises:
computing, without performing speech recognition, a hotword confidence score indicating a likelihood that the audio data includes the hotword; and
determining that the hotword confidence score satisfies a hotword confidence score threshold.

5. The method of claim 1, wherein:
the data processing hardware resides on a user device;
the user device is in one of a sleep mode, standby mode, or low-energy mode while receiving the audio data, determining that the received audio data includes the hotword, and processing the audio data; and
the user device remains in the one of the sleep mode, the standby mode, or the low-energy mode after determining to bypass performing the command preceded by the hotword.

6. The method of claim 1, wherein determining to bypass performing the command preceded by hotword comprises bypassing performing speech recognition on a portion of the received audio corresponding to the utterance of the command.

7. The method of claim 1, further comprising:
analyzing, by the data processing hardware, the audio watermark to identify a source of the audio data corresponding to playback of the item of media content,
wherein determining to bypass performing the command preceded by hotword is further based on the source of the audio data corresponding to playback of the item of media content.

8. The method of claim 7, further comprising updating, by the data processing hardware, a log file to indicate the source of the audio data corresponding to playback of the item of media content.

9. The method of claim 1, further comprising:
analyzing, by the data processing hardware, the audio watermark to identify a source of the audio data corresponding to playback of the item of media content,
wherein determining to bypass performing the command preceded by hotword is further based on the source of the audio data corresponding to playback of the item of media content.

10. The method of claim 1, wherein the audio watermark is included in a portion of the audio data that includes the hotword.

11. A system comprising:
data processing hardware; and
memory hardware in communication with the data processing hardware and storing instructions, that when executed on the data processing hardware, cause the data processing hardware to perform operations comprising:
receiving audio data corresponding to playback of an item of media content, the audio data comprising an audio watermark and an utterance of a command preceded by a hotword;
determining that the received audio data includes the hotword;
processing the audio data to:
identify the audio watermark included in the audio data; and
determine a corresponding bitstream of the audio watermark; and
based on the determined corresponding bitstream of the audio watermark, determining, without accessing an audio watermark database to identify a matching audio watermark, to bypass performing the command preceded by hotword.

12. The system of claim 11, wherein the audio watermark is added to the audio data by a creator of the item of media content.

13. The system of claim 11, wherein processing the audio data to identify the audio watermark in the audio data comprises detecting a spread spectrum shaping type of watermark.

14. The system of claim 11, wherein determining that the received audio data includes the hotword comprises:
   computing, without performing speech recognition, a hotword confidence score indicating a likelihood that the audio data includes the hotword; and
   determining that the hotword confidence score satisfies a hotword confidence score threshold.

15. The system of claim 11, wherein:
   the data processing hardware resides on a user device;
   the user device is in one of a sleep mode, standby mode, or low-energy mode while receiving the audio data, determining that the received audio data includes the hotword, and processing the audio data; and
   the user device remains in the one of the sleep mode, the standby mode, or the low-energy mode after determining to bypass performing the command preceded by the hotword.

16. The system of claim 11, wherein determining to bypass performing the command preceded by hotword comprises bypassing performing speech recognition on a portion of the received audio corresponding to the utterance of the command.

17. The system of claim 11, wherein the operations further comprise:
   analyzing the audio watermark to identify a source of the audio data corresponding to playback of the item of media content,
   wherein determining to bypass performing the command preceded by hotword is further based on the source of the audio data corresponding to playback of the item of media content.

18. The system of claim 17, wherein the operations further comprise updating a log file to indicate the source of the audio data corresponding to playback of the item of media content.

19. The system of claim 11, wherein the operations further comprise:
   analyzing the audio watermark to identify a source of the audio data corresponding to playback of the item of media content,
   wherein determining to bypass performing the command preceded by hotword is further based on the source of the audio data corresponding to playback of the item of media content.

20. The system of claim 11, wherein the audio watermark is included in a portion of the audio data that includes the hotword.

* * * * *